March 31, 1970
R. E. TURNAGE, JR
3,504,334
RECTANGULAR COORDINATE INDICATING SYSTEM
EMPLOYING CORDLESS STYLUS
Filed Oct. 16, 1968
3 Sheets-Sheet 1
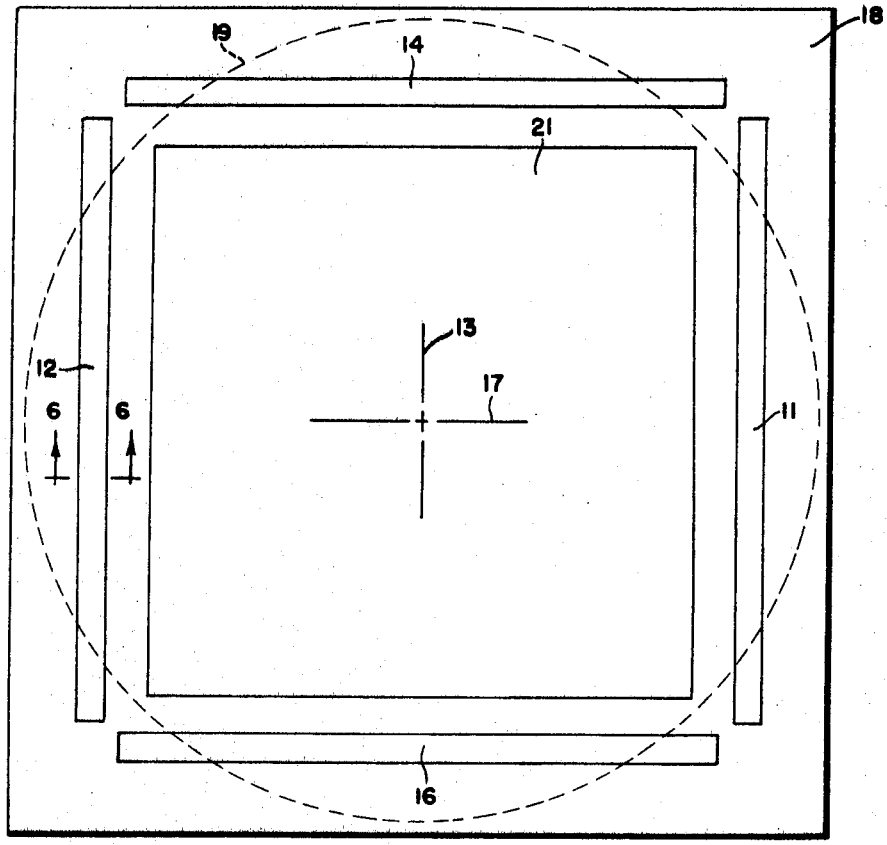
FIG.1
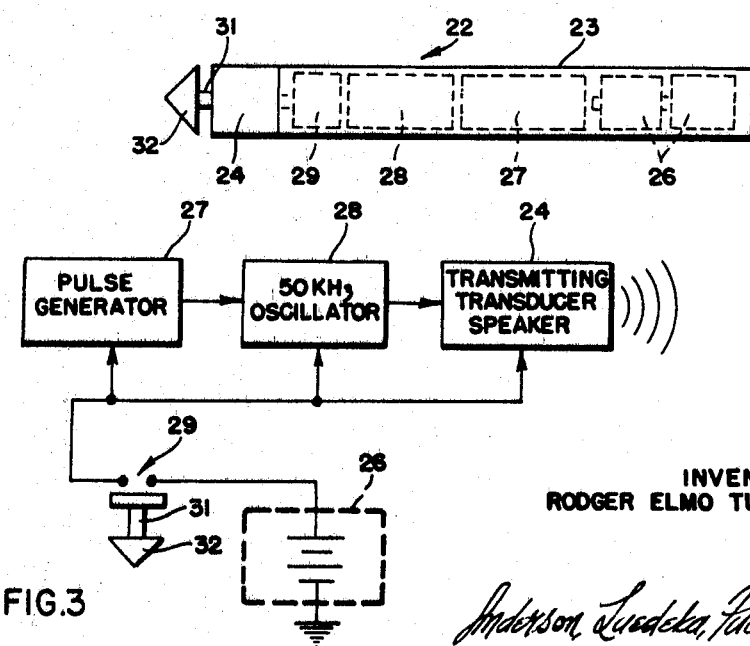
FIG.2
FIG.3
INVENTOR
RODGER ELMO TURNAGE JR.
ATTYS.

INVENTOR
RODGER ELMO TURNAGE JR.

INVENTOR
RODGER ELMO TURNAGE JR.
ATTYS.

United States Patent Office 3,504,334
Patented Mar. 31, 1970

3,504,334
RECTANGULAR COORDINATE INDICATING SYSTEM EMPLOYING CORDLESS STYLUS
Rodger Elmo Turnage, Jr., San Diego, Calif., assignor to Stromberg Datagraphix, Inc., San Diego, Calif., a corporation of Delaware
Filed Oct. 16, 1968, Ser. No. 768,079
Int. Cl. G01s 5/18
U.S. Cl. 340—16                 12 Claims

ABSTRACT OF THE DISCLOSURE

A system is described for indicating the rectangular coordinate location of a hand held cordless stylus or pointer. The stylus emits an energy wave, and the arrival times of the energy wave front at sensors positioned along the X and Y axes are compared. The differences in arrival times are measured to indicate the displacement of the stylus from the X and Y axes.

---

This invention relates generally to systems for indicating the location of a stylus or pointer. More particularly, the invention relates to an improved system of the type described and in which the stylus need not be connected to the remainder of the system by any cord, cable or other material means.

In connection with many types of visual displays, it sometimes is desirable to electronically identify the coordinates of selected points on the display. Coordinate location information of this type may be useful for such purposes as determining positions on a map or other display. Coordinate location information may also be utilized on a continuous basis for transmitting graphical information, such as handwriting or drawings, to a remote location, or for storing such information in a computer memory for reproduction at a later time.

In cathode ray tube displays, hand held styli or pointers containing photoelectric cells may be utilized for detection of the light flash caused on the phosphor by the electron beam of the cathode ray tube, thus producing coordinate location information. The stylus is known to be at the position to which the beam was directed at the instant of the flash. Since the electron beam of the cathode ray tube is used to read the position of the stylus or pointer, interruption of the display cycle of the cathode ray tube is usually required if the particular location is not on the normal beam sweep pattern (i.e., where no data is displayed at the stylus position). This may be undesirable. Moreover, such a system is inapplicable to displays other than those produced by cathode ray tubes.

In order to produce a more versatile system, some display surfaces have heretofore been covered or overlaid with a transparent resistive sheet, such as a sheet of glass coated on its exposed surface with tin oxide. The sheet is energized with a potential difference applied alternately across its length in each of two coordinate directions. A conductive stylus touched to some point on the surface detects a potential which is alternately representative of the first and second coordinates of the point. Problems may be encountered in such systems, however, due to non-uniformities in the resistive sheet and to accumulations of non-conductive substances, such as grease, on the resistive surface. Furthermore, if the stylus is moved while in contact with the surface, to indicate the drawing of a line, excessive electrical noise and spurious coordinate pairs may be generated because of the roughness of the resistive surface.

Some types of known location indicating systems, using energy transmitting devices fixed at locations about the display area and styli or pointers to receive energy at selected points, operate on the basis of detecting the time between transmission from the energy source and receipt of the energy wave front at the selected point. Because both the start and the receipt instants of wave front propagation are critical to operation of such a system, it has heretofore been necessary that the stylus or pointer be connected to the remainder of the system (such as a display console) by a cord or cable. This can be inconvenient and cumbersome to a person holding the stylus or pointer, and may at times interfere with the movement of the stylus or pointer. Furthermore, systems wherein the transmitting and receiving devices are essentially located at points provide coordinate information which is non-linear, or is in non-rectangular coordinates, such as hyperbolic coordinates.

Accordingly, it is an object of this invention to provide an improved system for indicating the rectangular coordinate location of a source of energy.

Another object of the invention is to provide a system for determining the location of a hand held stylus or pointer without the necessity of attaching the stylus or pointer to the remainder of the system with any wire, cable, or other material means.

A further object of the invention is to provide a location indicating system for a display, which is not dependent upon the presence of displayed data at the location being indicated.

It is another object of the invention to provide an improved system for indicating rectangular coordinate location without generating excessive electrical noise and spurious coordinate pairs.

Other objects of the invention will become apparent to those skilled in the art from the following description, taken in connection with the accompanying drawings wherein:

FIGURE 1 is a plan view of a display arrangement adapted for utilizing the system of the invention;

FIGURE 2 is a schematic side view of a pointer for utilization in the system of the invention;

FIGURE 3 is a block diagram of electrical circuits used in the pointer of FIGURE 2;

Figure 4:
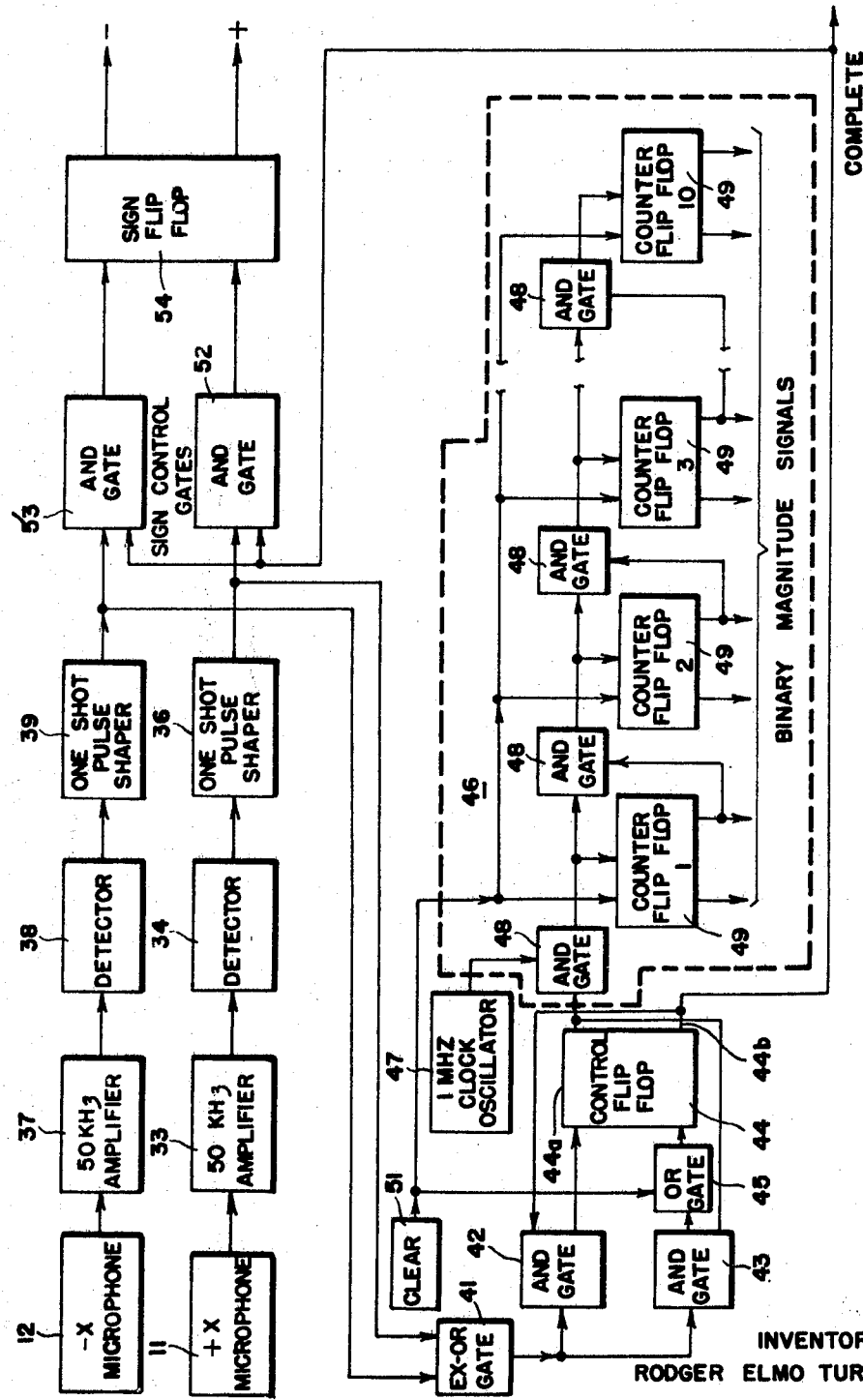
FIGURE 4 is a block diagram of electrical circuits used in the system of the invention.

Very generally, the system of the invention is utilized for indicating the rectangular coordinate location of a source of energy having a symmetrical propagation wave front in the coordinate plane. The system comprises elongated positive and negative X axis sensing means 11 and 12 positioned on opposite sides of the Y coordinate axis 13 equidistant therefrom and parallel thereto. Elongated positive and negative Y axis sensing means 14 and 16 are positioned on opposite sides of the X coordinate axis 17 equidistant therefrom and parallel thereto. The differences in arrival times of the energy wave front at the positive and negative X axis sensing means and at the positive and negative Y axis sensing means are detected to indicate the displacement of the energy source from the Y axis and the X axis, respectively.

Referring now more particularly to FIGURE 1, part of a cathode ray tube display console with which the system of the invention may be used is illustrated. The display console includes a front panel 18 and a cathode ray tube disposed behind the front panel and indicated in outline at 19. The central region of the display panel 18 is open to define a square display area 21 on the face of the cathode ray tube 19.

In the system of the invention, the initial location information is obtained from a stylus or pointer 22 which constitutes a source of propagatable energy. As may be seen from FIGURE 2, the pointer 22 includes a cylindrical housing 23 having a transducer 24 mounted at one end. The transducer 24 is for producing energy in the form of ultrasonic vibrations which are propagated from the transducer with a generally symmetrical propagation wave front. Preferably, the wave front is generally circular or cylindrical at and near the plane of the display. For example, the transducer may comprise an omnidirectional speaker which produces a generally hemispherical wave front. Such a transducer is satisfactory for use in the system of the invention because the effective portion of the propagated hemispherical wave front produced lies in and near the plane of the rectangular coordinate system and may be considered as a cylindrical or circular wave front.

Also contained within the housing 23 of the pointer 22 are an energizing battery 26, a pulse generator 27, and an ultrasonic oscillator 28 for producing an output signal of, for example, 50 kHz. The electrical arrangement of the foregoing items may be seen in FIGURE 3. A switch 29 is also contained within the housing 23 and, as may be seen from FIGURE 3, connects the battery 26 with the pulse generator 27, the oscillator 28 and the speaker or transducer 24, to supply power thereto.

An actuating plunger 31 extends from the switch 29 through the transducer 24 and projects outwardly of the transducer. A conical tip 32 is mounted on the free end of the plunger 31 and the plunger is biased outwardly by a suitable spring, not shown. This maintains the tip 32 spaced from the transducer 24 and holds the switch 29 normally open.

When a point in the display area 21 is selected, the location of which is to be indicated in rectangular coordinates by the system of the invention, the tip 32 of the pointer 22 is pressed against the face of the cathode ray tube 19 at the selected point. The switch 29 within the housing 23 is momentarily closed and causes the batteries 26 to energize the pulse generator 27. The pulse generator emits a single pulse of a suitable duration; for example, 100 microseconds duration is typically satisfactory. The pulse from the pulse generator 27 is applied to the oscillator 28 which turns on the oscillator to apply a short burst of high frequency energy to the transducer 24. For example, a pulse generator output pulse of 100 microseconds duration and an oscillator output frequency of 50 kHz. will result in a burst of energy of about 5 cycles duration being propagated from the transducer 24.

Returning now to FIGURE 1, it may be seen that sensors 11, 12, 14 and 16 are positioned along the four sides of the square display area 21. The sensors each consist of a receiving transducer or microphone in the form of a long strip parallel to one side of the square display area 21 and spaced a short distance from such side. The details of a satisfactory transducer construction are described below in connection with FIGURE 6. The X axis of the rectangular coordinate system, to which the system of the invention references, extends across the display area perpendicular to the positive X axis sensor 11 and the negative X axis sensor 12. The X axis 17 is located midway between the Y axis sensors 14 and 16. The Y axis of the coordinate system extends across the display area perpendicular to the X axis 17 and to the positive Y axis sensor 14 and the negative Y axis sensor 16. The Y axis 13 is located midway between the X axis sensors 11 and 12 and is parallel therewith.

When the location of the pointer or source of energy is to be determined, a symmetrical wave front of energy is propagated from the pointer as previously described. In the illustrated embodiment, the propagated wave front being circular in the coordinate plane, the wave front will strike the four sensors 11, 12, 14 and 16 in succession, the nearest sensor being struck first and the furthest sensor being struck last.

Of course, a wave front originating on the X axis will initially strike the Y axis sensors 14 and 16 at the same time, and a wave front originating on the Y axis will initially strike the X axis sensors 11 and 12 at the same time.

The wave strikes a particular elongated sensor initially at the point along its length which is nearest the source of energy. Thereafter, the wave front will strike more distant points of the same sensor as time passes. Although the electrical signal generated by the sensor at some point more distant than the point of initial stimulation may be opposite in phase to the initial sensed signal, the latter signal will be stronger and will predominate in the composite output signal of the sensor. This is because the strength of the sonic wave varies inversely with the square of its distance from the source. Consequently, the wave of energy at the initial point of stimulation of the elongated sensor is considerably stronger than the wave at subsequent points of stimulation.

The difference in the times of first stimulation of the X axis sensors is proportional to the distance of the source from the center of the X axis. Similarly, the difference in times of initial stimulation of the Y axis sensors is proportional to the distance of the source from the center of the Y axis. For example, if the source is off-centered in the X direction by 6 inches, the sonic wave path to the farthest X axis sensor is 1 foot longer than to the nearest X axis sensor. The signal from the nearest X axis will therefore begin about 0.9 millisecond before the signal from the far sensor, since sonic waves travel in air at about 1100 feet per second or 1.1 feet per millisecond.

In addition to being capable of providing a quantitative indication of displacement of the pointer or energy source from the X and Y axes, the arrangement illustrated in FIGURE 1 is also capable of providing an indication of the sign of the displacement. Thus, the first of the two X axis sensors to be stimulated by the wave front of the pulse from the energy source will depend upon whether the source is displaced in the positive or negative direction along the X axis from the Y axis. The same is true with respect to the Y axis sensors.

In order to provide an indication of the rectangular coordinate location of the pointer or source of energy in accordance with the foregoing discussed principles, electronic circuitry is utilized for processing the output signals from the sensors 11, 12, 14 and 16. Thus circuitry measures the difference in times of arrival of the wave front and also determines the sensor at which the wave front arrives first. As previously mentioned, the difference time is determinative of the magnitude of the particular coordinate, whereas the particular sensor on the respective axes at which the wave front arrives first is determinative of the sign of the particular coordinate.

Circuitry for accomplishing this for the X axis is shown in FIGURE 4. It is to be understood that the circuitry for the Y axis, although not shown, is identical. In certain applications some of the components for the two axes may be shared rather than duplicated. Thus, if system timing permits determination of the X and Y coordinate sequentially, all electronic blocks in FIGURE 4 may be shared except for the sensors. On the other hand, if both the X and Y coordinates are desired simultaneously, it may not be possible to avoid duplication except for the timing pulse oscillator, described subsequently.

Referring now more particularly to FIGURE 4, the positive X axis sensor 11 applies its output to a narrow band amplifier 33 which amplifies signals of the frequency emitted by the signal source or pointer (in the previous example, 50 kHz.). The output of the amplifier 33 is applied to a detector 34 which operates a one-shot pulse shaper 36. The pulse shaper 36 emits a narrow square wave pulse in response to a detector 34 output resulting from receipt of an ultrasonic pulse from the pointer or energy source.

The negative X axis microphone 12 is similarly connected to a narrow band amplifier 37, a detector 38, and a one-shot pulse shaper 39. These items are identical to the items used in connection with the positive X axis microphone 11.

The outputs of both the pulse shaper 36 and the pulse shaper 39 are applied to an exclusive OR gate 41. The exclusive OR gate 41 provides an output signal when a signal is applied to either one, but not both, of its inputs. Details are given below in connection with FIGURE 5. The output of the exclusive OR gate 41 is applied to an AND gate 42 and also to AND gate 43. The AND gate 42 is coupled to one control input of a control flip-flop 44 and the AND gate 43 is coupled to the other control input of flip-flop 44 through the OR gate 45. A pulse applied to the control flip-flop 44 from the AND gate 42 will cause the control flip-flop to provide a signal at its uppermost output 44a. A pulse applied to the control flip-flop from the AND gate 43 will cause the control flip-flop to provide a signal at its lowermost output 44b. The output 44a is coupled to the enabling input of the AND gate 43, and the output 44b is coupled to the enabling input of the AND gate 42.

Figure 5:
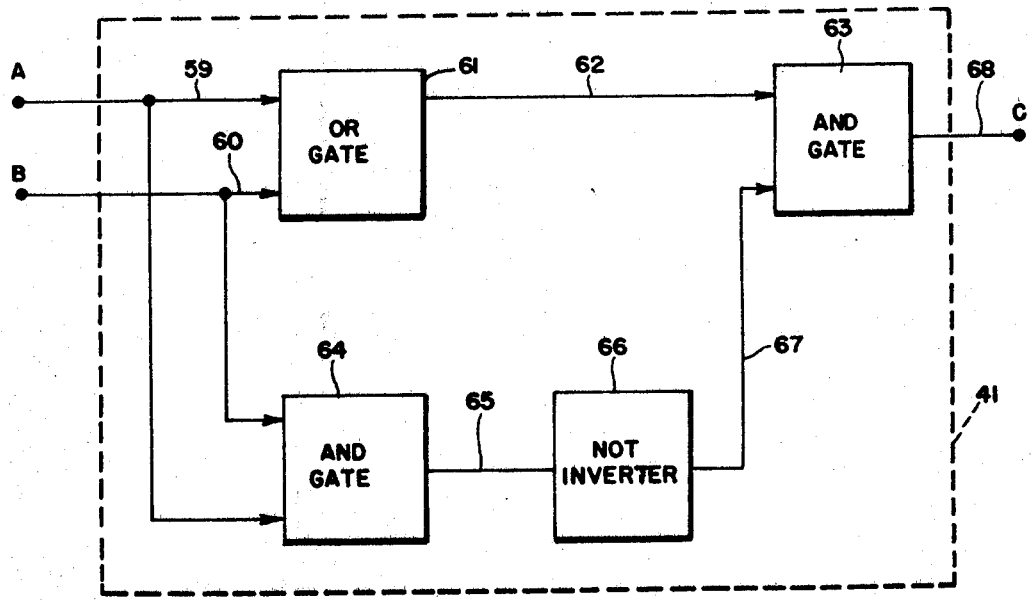
FIGURE 5 is a block diagram illustrating the nature of the exclusive OR gate 41 of FIGURE 4.

The exclusive OR gate 41 may be seen in greater detail in FIGURE 5. The exclusive OR gate 41 includes two inputs 59 and 60 connected to terminals A and B, respectively. An OR gate 61 is connected to the two inputs 59 and 60, and provides a single output 62. The output 62 is applied to one input of an AND gate 63. The inputs 59 and 60 are also connected to an AND gate 64, having a single output 65 connected to a NOT inverter 66. The output 67 of the NOT inverter 66 is connected to the other input of the AND gate 63. The AND gate 63 provides an output 68.

If neither terminal A nor B has a signal, there is no output from the OR gate 61 at the output 62. Hence, one input of the AND gate 63 is absent, and there is no output at 68. If both inputs 59 and 60 have signals due to the presence of signals at both terminals A and B, there is an output from the AND gate 64 at 65. But the NOT inverter 66 provides no output in the presence of an input signal, and therefore there is only one input signal to the AND gate 63, and there is no output at 68. If, however, a signal is present at either A or B, but not both, the OR gate provides an output at 62 and the AND gate 64 has no output at 65. Thus, the NOT inverter 66 provides an output at 67, resulting in two inputs to the AND gate 63. This results in an output at 68.

The control flip-flop 44 is used to control a binary counter 46 which operates on timed pulses from a highly stable and accurate clock oscillator 47. The binary counter 46 is constructed in accordance with known principles and includes a plurality of sequentially connected AND gates 48, each controlling the flow of timing pulses to a respective counter flip-flop 49. The enabling of a particular one of the AND gate 48 permits any timing pulse applied to its input to pass through to the corresponding flip-flop. Any pulse reaching a flip-flop from its AND gate changes the flip-flop from its current condition (0 or 1) to the other or complementary condition (1 or 0). In the 1 condition, the flip-flop applies an enabling pulse to the next succeeding AND gate so that such AND gate will conduct upon receipt of a pulse from the clock oscillator. In the illustrated embodiment, ten flip-flops 49 and associated AND gates 48 are utilized.

In operation, if the pulse shapers 36 and 39 apply simultaneous pulses to the exclusive OR gate 41, the exclusive OR gate 41 produces no output and the binary counter 46 remains registering zero. This indicates a zero X axis displacement from simultaneous sensing, by the sensors 11 and 12, of the energy wave produced by the pointer 22.

If the energy source or pointer 22 is displaced along the X axis, the initially received or sensed wave front arrival causes a pulse to be produced first by one of the two pulse shapers 36 and 39 depending upon whether there is a positive or negative X displacement. This first pulse is passed by the exclusive OR gate 41 and is applied to the AND gates 42 and 43. As will be explained, the AND gate 43 is initially disabled. Accordingly, the output of the exclusive OR gate does not result in an output from the AND gate 43.

On the other hand, the initial condition of the AND gate 42 is such as to pass the pulse output from the exclusive OR gate 41. This pulse is applied to the upper control input of the control flip-flop 44, causing the flip-flop 44 to produce a signal at its uppermost output 44a. The output 44a of the flip-flop 44 is applied to the binary counter 46 to enable the first AND gate 48 therein to pass a pulse from the oscillator 47. The output 44a of the control flip-flop 44 is also applied to the AND gate 43 to place the AND gate in an enabled condition to pass the next pulse it receives.

During the interval between the first pulse, which actuates the binary counter 46 as previously described, and the second pulse received by the exclusive OR gate 41, the binary counter continues to count pulse from the clock oscillator 47. Upon receipt of the second pulse by the exclusive OR gate 41, a pulse is applied to both the AND gate 42 and the AND gate 43. Since the output of the control flip-flop 44 at 44b is removed, the AND gate 42 is in a disabled condition and blocks passage of the second pulse output of the OR gate 41 to the control flip-flop 44.

The pulse output of the exclusive OR gate 41 is, however, passed by the AND gate 43 since it has been placed in the enabled condition by the output 44a from the control flip-flop 44. Accordingly, the AND gate 43 passes a pulse via OR gate 45 to the lower control input of the control flip-flop 44, shifting the state of the control flip-flop. This stops operation of the binary counter 46 (explained below) and produces a signal at the lower output 44b of the control flip-flop. The latter signal is utilized as a "complete" signal indicating the completion of counting. The "complete" signal is also applied to the AND gate 42 to place such AND gate in an enabled condition to pass the next pulse, and to the sign control AND gates 52 and 53, for a purpose explained subsequently.

When the output 44a of the control flip-flop 44 is removed from the first AND gate 48 in the binary counter 46, such AND gate ceases to pass pulses from the clock oscillator 47 and the binary counter ceases its operation. At this point, the binary counter has counted the number of pulses from the clock oscillator 47 representative of the time interval between the two successive pulses received from the pulse shapers 36 and 39. A suitable source of signals 51 is provided for clearing the binary counter before the next coordinate position is determined.

The output of the binary counter 46 may be utilized in any desired manner. For example, the outputs of two counters 46, representing the X and Y coordinates of the pointer 22, may be transmitted to the memory of a digital computer to indicate a location on the screen of CRT 19 where the computer is to position a symbol. Alternatively, the outputs of two counters 46 may be introduced directly into the binary beam positioning registers of a computer driven display having a CRT 19, so that a symbol may be displayed on the CRT screen at a location directly under the pointer 22. The binary output signals of counter 46 may also be utilized to produce a visual indication of the time difference on numerical in-line readout devices or to make a permanent record on punched cards, magnetic tape, or perforated tape. The binary signals may also be used to control the stylus of an incremental graph plotting device, causing the plotting stylus to follow a path similar to the path of the pointer 22.

The precision available in the system depends upon the frequency of the clock oscillator 47 and the number of flip-flops or stages in the binary counter 46. For a clock oscillator frequency of 1 mHz., a ten stage binary counter and a 12 inch by 12 inch display area, a precision of ± 0.013 inch is attainable. Overall accuracy may be somewhat less than this due to various other factors.

The circuitry illustrated in FIGURE 4 also operates to provide an indication of the sign of the difference signal produced by the binary counter 46. The one-shot pulse shaper 36, in addition to having its output coupled to the exclusive OR gate 41, has its output coupled to an AND gate 52. Similarly, the output of the one-shot pulse shaper 39 is applied to the AND gate 53 in addition to the exclusive OR gate 41. The AND gates 52 and 53 are coupled to apply their outputs to respective inputs of a sign indicating flip-flop 54. The output of the flip-flop 54 depends upon which of the two AND gates 52 and 53 applies an input signal thereto. The enabling inputs of AND gates 52 and 53 receive signals from the lower output 44b of the flip-flop 44. Therefore, when operation of the system is initiated, the AND gates 52 and 53 have signals applied at their enabling inputs from the flip-flop 44.

Assuming the first pulse is initiated by the pulse shaper 36, the AND gate 52 applies a pulse to the sign flip-flop 54, indicating a positive sign. This corresponds to the positive X axis sensor 11 receiving the first stimulation by the energy wave produced by the energy source or pointer. In addition, the output of the pulse shaper 36 is applied to the flip-flop 44, as described above, resulting in a zero signal at output 44b which disables the AND gates 52 and 53. The second pulse, produced by the pulse shaper 39, is therefore blocked and does not pass the gates 52 and 53 to the sign flip-flop 54. Accordingly, the sign flip-flop remains indicating a positive sign. The function of the circuitry is similar and opposite in the event the initial stimulation is of the minus X axis sensor 12.

Figure 6:
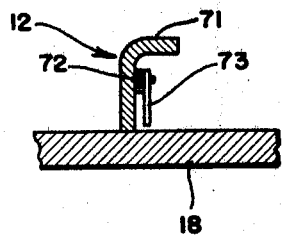
FIGURE 6 is an enlarged sectional view taken along the line 6—6 of FIGURE 1.

Referring now to FIGURE 6, details of a satisfactory form of microphone or transducer for use as the X and Y axis sensors may be seen. The sensor shown is the negative X axis sensor 12, but it is to be understood that the others may be similar. The sensor 12 includes a metal support and shield structure 71 of L-shaped cross section mounted on the panel 18. At the apex of the L and underneath the overhanging side of the structure 71 is a strip 72 of electrical insulation. A long strip type diaphragm 73 of thin metal extends alongside the strip 72 secured thereto but spaced from the structure 71. The diaphragm is movable in response to receipt of the high frequency pressure wave propagated by the stylus 22. Suitable electrical connection (not shown) may be made to the sensor 12 to provide a varying electrical signal due to changes in capacitance produced by movement of the diaphragm 73, as is known in the art. As an alternative to the particular sensor construction shown, other devices may be used, such as a sensor utilizing an elongated strip of piezoelectric material.

It may therefore be seen that the invention provides an improved system for indicating the rectangular coordinate location of a pointer or stylus. The system may be utilized to digitally describe the position and/or movement of the stylus and the stylus need not be connected to the remainder of the system by any cord, cable, or other material means. The indication of stylus or pointer position may be determined without the prior presence of displayed data of any kind at the selected position, and indications of displacement and sign are provided without the generation of excessive electrical noise and spurious coordinate pairs. Although described in connection with a cathode ray tube display, the invention is applicable to other types of displays as well. Moreover, although the propagating medium for the energy produced by the stylus is air in the described system, the panel upon which the display is produced or a transparent sheet covering the display surface may be used as the propagating medium. In such case, of course, appropriate types of transducers can be used for transmitting and receiving the signals, and some provision may be desirable for attenuating signal reflections at the periphery of the panel.

Various modifications of the invention in addition to those shown and described herein will become apparent to those skilled in the art from the foregoing description and accompanying drawings.

What is claimed is:

1. A system for indicating the rectangular coordinate location on a generally planar display area of a source of energy having a symmetrically propagating wave front in the coordinate plane, comprising, elongated positive and negative X axis sensing means positioned on opposite sides of the Y coordinate axis equidistant therefrom and parallel thereto, elongated positive and negative Y axis sensing means positioned on opposite sides of the X coordinate axis equidistant therefrom and parallel thereto, said elongated sensing means being of a length which is at least as great as the corresponding dimension of the display area, and means connected to said sensing means for detecting the difference in the times of the initial arrival of the energy wave front at said positive and negative X axis sensing means and the difference in the times of the initial arrival of the energy wave front at said positive and negative Y axis sensing means, such time differences being indicative of the displacements of the source from the Y axis and X axis, respectively.

2. A system according to claim 1 including further means connected to said sensing means for detecting that of said X axis sensing means and that of said Y axis sensing means at which the energy wave front first arrives, such being indicative of the sign of the corresponding displacement indication.

3. A system according to claim 1 wherein said detecting means include a pulse counter, an oscillator for producing timed pulses, and means for applying timed pulses from said oscillator to said pulse counter during the interval between the arrivals of the energy wave front at said positive and negative sensing means for at least one of the X and Y axes.

4. A system according to claim 3 wherein said applying means include an AND gate, a control flip-flop for controlling said AND gate, and means for operating said control flip-flop to enable said AND gate during the interval between the arrivals of the energy wave front at said positive and negative sensing means.

5. A system according to claim 4 wherein said detecting means include means for producing pulses representative of the energy wave front initial arrivals, and wherein said operating means comprise first and second AND gates connected to respective inputs of said control flip-flop for passing such pulses thereto, said operating means further comprising an exclusive OR gate coupled to both of said first and second AND gates for passing selected ones of such pulses thereto from said pulse producing means, said exclusive OR gate providing an output pulse to said first and second AND gates whenever an input pulse is provided to it from either one but only one of said pulse producing means.

6. A system according to claim 2 wherein said further detecting means comprise a first AND gate coupled to one of said positive sensing means, a second AND gate coupled to the corresponding one of said negative sensing means, a flip-flip coupled to both of said first and second AND gates and operable thereby to respective states in response to energy pulses received by said sensing means and passed by corresponding AND gates, and controlling means coupled to said first and second AND gates for disabling both AND gates immediately after receipt of the first pulse, whereby said flip-flop remains in the state to which it is operated by the first received pulse.

7. A system for indicating the rectangular coordinate location of a selected point comprising: a rectangular coordinate plane having orthogonal X and Y axes, a stylus for indicating selected positions within the plane, means within the stylus for initiating the propagation of a pulse of energy with a symmetrical wave-front in the plane, elongated positive and negative X axis energy sensing means positioned in the plane on opposite sides of the Y coordinate axis equidistant therefrom and parallel thereto, elongated positive and negative Y axis sensing means positioned in the plane on opposite sides of the X coordinate axis equidistant therefrom and parallel thereto, said sensing means being of a length which is at least as great as the corresponding dimension of the coordinate plane, means for detecting the arrival of the energy wavefront at said positive and negative sensing means and generating arrival pulses coincident therewith, and measuring means responsive to said arrival pulses for determining the difference in arrival times of the wavefront at said positive and negative X axis sensing means, and the difference in arrival times of the wavefront at said positive and negative Y axis sensing means, whereby, the measured time differences are indicative of the displacement of the stylus from the Y axis and X axis respectively.

8. A system according to claim 7 including means responsive to said arrival pulses for determining the one of said two X axis sensing means at which the energy wave first arrives, and the one of said two Y axis sensing means at which the energy wave first arrives, such determinations being indicative of the direction of the corresponding displacements.

9. A system according to claim 7 wherein said measuring means includes a pulse counter, an oscillator for providing accurately spaced timing pulses, and means for applying said timing pulses to said pulse counter during the interval between the arrivals of the energy wavefront at said positive and negative sensing means for at least one of said X and Y axes.

10. A system according to claim 7 wherein said stylus is adapted for manual support and positioning, wherein said initiating means include driving means and power supplying means, and are contained entirely within the stylus, and wherein the propagated wave constitutes the only signal flow between the stylus and the balance of the system in either direction, whereby, the system determines the coordinates of the stylus while the stylus is not attached to the balance of the system by any material means.

11. A system according to claim 7 wherein the energy pulse is a burst of sonic energy, the symmetrical wavefront is a circular pressure wave, the initiating means comprise a sonic oscillator and transducer, and the elongated sensing means are sonic microphones.

12. A system according to claim 7 wherein the energy pulse is a burst of supersonic energy, the symmetrical wavefront is a circular pressure wave, the initiating means comprise a supersonic oscillator and transducer, and the elongated sensing means are supersonic microphones.

References Cited

UNITED STATES PATENTS

| | | | |
|---|---|---|---|
| 2,916,289 | 12/1959 | Zito | 340—16 X |
| 2,951,248 | 8/1960 | Goodell | 343—13 |
| 3,134,099 | 5/1964 | Woo. | |
| 3,156,766 | 11/1964 | Stamps. | |
| 3,176,263 | 3/1965 | Douglas | 340—16 |
| 3,275,095 | 9/1966 | Blizard. | |
| 3,383,690 | 5/1968 | Keller | 340—16 X |
| 3,421,138 | 1/1969 | Moulin et al. | 340—6 X |

RICHARD A. FARLEY, Primary Examiner

U.S. Cl. X.R.

343—112